(12) United States Patent
Roseberg et al.

(10) Patent No.: US 12,456,083 B2
(45) Date of Patent: Oct. 28, 2025

(54) SYSTEMS AND METHODS FOR AUTOMATION DISCOVERY RECALCULATION USING DYNAMIC TIME WINDOW OPTIMIZATION

(71) Applicant: NICE LTD., Ra'anana (IL)

(72) Inventors: Eran Roseberg, Hogla (IL); Yaron Moshe Bialy, Madrid (ES); Yuval Shachaf, Even Yehuda (IL)

(73) Assignee: NICE LTD., Ra'Anana (IL)

( * ) Notice: Subject to any disclaimer, the term of this patent is extended or adjusted under 35 U.S.C. 154(b) by 0 days.

(21) Appl. No.: 17/742,944

(22) Filed: May 12, 2022

(65) Prior Publication Data

US 2023/0368104 A1    Nov. 16, 2023

(51) Int. Cl.
*G06Q 10/063* (2023.01)
*G06Q 10/0631* (2023.01)
(Continued)

(52) U.S. Cl.
CPC ... *G06Q 10/0633* (2013.01); *G06Q 10/06312* (2013.01); *G06Q 10/0637* (2013.01)

(58) Field of Classification Search
None
See application file for complete search history.

(56) References Cited

U.S. PATENT DOCUMENTS 10,163,058 B2 *  12/2018  Nitz .................... G06N 5/02
10,459,951 B2    10/2019  Venkataraman et al.
(Continued)

FOREIGN PATENT DOCUMENTS

CN    111046158 A  *  4/2020  .......... G06F 16/355

OTHER PUBLICATIONS

V. Leno, A. Augusto, M. Dumas, M. La Rosa, F. M. Maggi and A. Polyvyanyy, "Identifying Candidate Routines for Robotic Process Automation from Unsegmented UI Logs," 2020 2nd International Conference on Process Mining (ICPM), Padua, Italy, 2020, pp. 153-160 (Year: 2020).*

(Continued)

*Primary Examiner* — Jerry O'Connor
*Assistant Examiner* — Philip N Warner
(74) *Attorney, Agent, or Firm* — PEARL COHEN ZEDEK LATZER BARATZ LLP

(57) ABSTRACT

A system and method may identify computer-based processes which may be candidates for automation. Embodiments may involve a semi-supervised approach for identifying processes as automation opportunities. Transition probabilities for pairs of routines within a candidate process may be calculated based on a set of instances of the process (e.g., in a dataset of computer actions) using a dynamic time-window optimization procedure, where transition times may be measured for a plurality of instances of a first and second routines of a given pair of routines, and where statistical distributions may be calculated and used for deriving one or more time windows, describing a predetermined percentile (e.g., the $70^{th}$ percentile) of the measured transitions and used for estimating a transition probability for the pair of routines. In some embodiments, the input set of transitions and routines may be generated by a user or business analyst using a graphical user interface (GUI).

20 Claims, 10 Drawing Sheets

(51) Int. Cl.
  *G06Q 10/0633* (2023.01)
  *G06Q 10/0637* (2023.01)
  *G06Q 10/10* (2023.01)

(56) References Cited

U.S. PATENT DOCUMENTS

| | | | |
|---|---|---|---|
| 10,496,050 B2* | 12/2019 | Marti | G05B 13/0265 |
| 10,572,821 B1* | 2/2020 | Gauf | G06F 9/4881 |
| 11,270,241 B2 | 3/2022 | Smutko et al. | |
| 11,281,936 B2* | 3/2022 | Ma | G06Q 10/06398 |
| 11,379,772 B2 | 7/2022 | Oberman et al. | |
| 11,433,536 B2 | 9/2022 | Berg et al. | |
| 11,481,304 B1* | 10/2022 | Kakhandiki | G06F 9/4843 |
| 11,481,420 B2 | 10/2022 | Smutko et al. | |
| 11,763,228 B2 | 9/2023 | Bialy et al. | |
| 11,875,136 B2* | 1/2024 | Araujo Soares | G06F 40/279 |
| 11,934,416 B2* | 3/2024 | Barello | G06N 20/00 |
| 2003/0074369 A1 | 4/2003 | Schuetze et al. | |
| 2006/0184410 A1* | 8/2006 | Ramamurthy | G06Q 10/10 706/8 |
| 2010/0121859 A1 | 5/2010 | Maeda et al. | |
| 2014/0282586 A1 | 9/2014 | Shear et al. | |
| 2015/0154526 A1 | 6/2015 | Yates et al. | |
| 2015/0261399 A1* | 9/2015 | Puzis | G06F 9/451 715/704 |
| 2017/0032417 A1 | 2/2017 | Amendjian et al. | |
| 2017/0060108 A1 | 3/2017 | Kakhandiki et al. | |
| 2017/0091636 A1* | 3/2017 | Polyakov | G06Q 10/10 |
| 2017/0124075 A1 | 5/2017 | Deng | |
| 2017/0262899 A1 | 9/2017 | Geraghty et al. | |
| 2017/0277625 A1 | 9/2017 | Shtuchkin et al. | |
| 2018/0032601 A1 | 2/2018 | Venkataraman et al. | |
| 2018/0113781 A1 | 4/2018 | Kim et al. | |
| 2018/0225583 A1 | 8/2018 | Chen et al. | |
| 2018/0302302 A1 | 10/2018 | Doggett et al. | |
| 2019/0007228 A1 | 1/2019 | Vuskovic et al. | |
| 2019/0025851 A1 | 1/2019 | Afrouzi | |
| 2019/0065993 A1* | 2/2019 | Srinivasan | G06N 20/00 |
| 2019/0087691 A1 | 3/2019 | Jelveh | |
| 2019/0180218 A1 | 6/2019 | Vigneswaran | |
| 2019/0205792 A1 | 7/2019 | Huang | |
| 2019/0317803 A1* | 10/2019 | Maheshwari | G06Q 30/01 |
| 2019/0384657 A1 | 12/2019 | Chen et al. | |
| 2020/0050983 A1 | 2/2020 | Balasubramanian et al. | |
| 2020/0104169 A1 | 4/2020 | Powell | |
| 2020/0125586 A1 | 4/2020 | Rezaeian et al. | |
| 2020/0134488 A1 | 4/2020 | Kim et al. | |
| 2020/0151826 A1 | 5/2020 | Ghaffar et al. | |
| 2020/0184278 A1* | 6/2020 | Zadeh | G06N 3/044 |
| 2020/0206920 A1* | 7/2020 | Ma | G06Q 10/0633 |
| 2020/0219033 A1 | 7/2020 | Smutko et al. | |
| 2020/0225583 A1 | 7/2020 | Yoshida et al. | |
| 2020/0233865 A1 | 7/2020 | Myers et al. | |
| 2020/0285936 A1* | 9/2020 | Sen | G06Q 50/40 |
| 2020/0396231 A1* | 12/2020 | Krebs | H04L 63/1425 |
| 2020/0401430 A1 | 12/2020 | Berg et al. | |
| 2020/0410392 A1 | 12/2020 | Verma et al. | |
| 2021/0086354 A1 | 3/2021 | Berg et al. | |
| 2021/0110345 A1 | 4/2021 | Iyer et al. | |
| 2021/0150137 A1 | 5/2021 | Chittari | |
| 2021/0158256 A1 | 5/2021 | Negulescu | |
| 2021/0232372 A1 | 7/2021 | Da Silva Baptista Russo et al. | |
| 2022/0044171 A1* | 2/2022 | Sinha | G06Q 10/0637 |
| 2022/0230112 A1* | 7/2022 | Nayak | G06Q 10/067 |
| 2022/0293022 A1 | 9/2022 | Shachaf et al. | |
| 2022/0327351 A1* | 10/2022 | Barello | G06Q 10/0633 |
| 2022/0365861 A1* | 11/2022 | DeFilippo | G06F 9/547 |
| 2023/0033536 A1* | 2/2023 | Nanniyur | G06N 20/00 |
| 2023/0099627 A1* | 3/2023 | Duckworth | G06Q 40/03 706/12 |
| 2023/0135962 A1* | 5/2023 | Lee | G06F 40/216 704/9 |
| 2023/0137193 A1* | 5/2023 | O'Brien | G08B 21/0423 340/573.1 |
| 2023/0359659 A1 | 11/2023 | Granit et al. | |

OTHER PUBLICATIONS

Marufuzzaman, Mohd, and Mamun Bin Ibne Reaz. "Hardware simulation of pattern matching and reinforcement learning to predict the user next action or smart home device usage." World Applied Sciences Journal 22.9 (2013): 1302-1309. (Year: 2013).

Agrawal et al., "Mining Sequential Patterns", Proceeding of the 11th International Conference on Data Engineering. CA: Los Alamitos, IEEE Computer Society, pp. 3-14, 1995.

Deisenroth et al., "PILCO: A Model-Based and Data-Efficient Approach to Policy Search", In Proceedings of the 28th International Conference on machine learning (ICML-11), pp. 465-472, 2011.

Kryon, "Automated Business Process Discovery", retrieved Sep. 6, 2019 from https://www.kryonsystems.com/process-discovery/.

Mnih et al. "Human-Level Control Through Deep Reinforcement Learning", Nature, 518(7540), pp. 529, 2015.

Pei et al., "Mining Sequential Patterns by Pattern-Growth: The Prefixspan Approach", IEEE Transactions on Knowledge and Date Engineering, 16(11 ), pp. 1424-1440, 2004.

Saputra, "Mining Sequential Patterns Using 1-PrefixSpan", Proceedings of World Academy of Science, Engineering and Technology, vol. 26, ISSN 1307-6884, pp. 499-504, Dec. 2007.

Van Hassel T et al., "Deep Reinforcement Learning with Double Q-Learning", Proceedings of the Thirtieth AAAI Conference on Artificial Intelligence (AAAI-16), pp. 2094-2100, 2016.

Xu et al., "Analysis of Web Access Sequence Based on the Improved PrefixSpan Algorithm", International Industrial Informatics and Computer Engineering Conference, pp. 788-791, 2015.

https://www.automationanywhere.com/home, printed on Jun. 15, 2022.

www.celonis.com, printed on Jun. 15, 2022.

https://www.fortressiq.com/, printed on Jun. 15, 2022.

https://www.kryonsystems.com/process-discovery/, printed on Jun. 15, 2022.

https://www.minit.io/use-cases/robotic-process-automationare, printed on Jan. 25, 2021.

https://processgold.com/company-news/new-website/, printed on Jan. 25, 2021.

https://www.promtools.org/doku.php, printed on Jan. 25, 2021.

https://www.abbyy.com/timeline/, printed on Jun. 15, 2022.

https://www.uipath.com/automation/enterprise, printed on Jan. 25, 2021.

Fournier-Viger, Phillipe, "A Survey of Sequential Pattern Mining," Data Science and Pattern Recognition, vol. 1, No. 1, Feb. 2017.

Fournier-Viger, Phillipe, et al., "VGEN: fast vertical mining of sequential generator patterns," The International Conference on Data Warehousing and Knowledge Discovery, pp. 476-488, 2014.

Yi, Shengwei, "An effective algorithm for mining sequential generators," Procedia Engineering 15 (2011).

Santos, F., Pereira, R., & Jose, B. V. (2020). Toward robotic process automation implementation: An end-to-end perspective. Business Process Management Journal, 26(2), 405-420. (Year: 2020).

Chandak, Yash, et al. "Learning action representations for reinforcement learning." International conference on machine learning. PLMR, 2019. (Year: 2019).

Dezfouli, Amir, and Bernard W. Balleine. "Habits, action sequences and reinforcement learning." European Journal of Neuroscience 35.7 (2012): 1036-1051. (Year: 2012).

\* cited by examiner

| TYPE | ROUTINE NAME | SCORE ▼ | # OCCU... | AVG. TI... | TOTAL TIME | APPLICATIONS | UNIQUE... | PROCESS NAME |
|---|---|---|---|---|---|---|---|---|
| ▢ | Paste, Freetext... | 100 | 1030 | 22.84 | 06:32:08 | explorer, OUT... | 5 | professional sal... |
| ✂ | crm.edit edition... | 94 | 413 | 10.16 | 01:09:57 | Training CRM... | 4 | professional sal... |
| ▢ | crm explorer ne... | 45 | 97 | 17.34 | 00:28:02 | explorer, Trai... | 2 | training crm exp... |
| ▢ | address edit edi... | 41 | 107 | 15.84 | 00:27:54 | RTClient, OU... | 1 | touch in get nic... |
| ▢ | explorer get in n... | 39 | 98 | 15.53 | 00:25:21 | explorer, WWW... | 2 | professional sal... |
| ▦ | Template | 39 | 22 | 56.28 | 00:20:38 | WINWORD... | 1 | |
| ▢ | edit edition expl... | 31 | 135 | 10.81 | 00:23:53 | explorer, RTC... | 2 | professional sal... |
| ⎗ | Copy, Paste an... | 31 | 498 | 14.92 | 02:03:52 | Training CRM... | 4 | training crm exp... |
| ▢ | edge get in micr... | 27 | 69 | 14.61 | 00:16:48 | WWW.NICE... | 2 | touch in get nic... |
| ▢ | edit edition prof... | 25 | 106 | 9.98 | 00:17:28 | RTClient, Iexp... | 1 | professional sal... |

FIG. 3

| REPORT SUMMARY | ℬ USERS 6 | ℬ TEAMS 1 | ✦ ACTIONS 118918 | ⊙ TOTAL RECORDED TIME 90h 33M | ⊞ DATES 22/11/2021 - 26/11/2021 | | Close | Recalculate |
|---|---|---|---|---|---|---|---|---|

| PROCESSES | ROUTINES | | | | | | Delete Process | New Process |
|---|---|---|---|---|---|---|---|---|
| Search 🔍 Showing 1-7 of 7 | | | | | | | | |
| ☐ # | PROCESS NAME | SCORE | TOTAL TIME | APPLICATIONS | UNIQUE USERS | # ROUTINES | NOTES | EST. SAVINGS $ (EDIT) |
| ☐ 1 | Contact and Flight Form Process | (81) | 03:32:33 | NOCE.COM; javaw; notepad; Acrobat; KOREABOO.COM; SPTH.GOB.E... | 5 | 2 | 🖳+ | 325,521 |
| ☐ 2 | properties wab notes city work code postal | (28) | 01:16:57 | Notepad; javaw; BLIMSFURNITURE.COM.PH; notepad; NOCE.CO; Tr... | 6 | 2 | 🖳+ | 117,865 |
| ☐ 3 | message travel spain flight health outlook html | (24) | 01:12:07 | LAZADA.COM.PH; SHOPEED.PH; WINWORD; notepad; PARENTS.COM.... | 4 | 2 | 🖳+ | 110,438 |
| ☐ 4 | new training crm application nice contact touch | (22) | 01:03:44 | NOCE.COM; ShellExperienceHost; Acrobat; WEBTOONS.COM; Trainin... | 5 | 2 | 🖳+ | 97,600 |

FIG. 5

SYSTEMS AND METHODS FOR AUTOMATION DISCOVERY RECALCULATION USING DYNAMIC TIME WINDOW OPTIMIZATION

FIELD OF THE INVENTION

The present invention relates generally to automation of computer processes previously performed by users; in particular to grouping identified routines into meaningful maps, describing processes that may be chosen as candidates for automations, by estimating routine transition probability using statistical methods.

BACKGROUND OF THE INVENTION

Companies and organizations such as call centers, or other businesses, may identify (e.g. "discover") business processes or "flows" that are significant candidates for robotic process automation (RPA), in that they are both feasible for automation and that automation would have high potential return on investment (ROI) by saving significant manual efforts and workloads when being handled by automated computer processes, "bots", or robots instead of human agents. Such automation opportunities may involve human-computer interactions. A bot created to replace or automate human-computer interactions may be an autonomous program that may interact with computer systems, programs, or users, and which may operate as would a human user.

In some approaches used in the art, this discovery and analysis process is sometimes done manually, which may be subjectively-biased, time consuming and very expensive. Thus, various methods exist, machine based, human based, and machine-human hybrids, to find automation opportunities. Technologies such as process mining tools may use high-level system-specific event logs as input data, such as case identification (ID) (e.g. Process ID), activity ID and, timestamp to identify automation opportunities. Log data is, by definition, labeled (labels exists in the data gathered from the event logs) making it much simpler to analyze automatically. A case ID may identify the process instance and an activity ID may specify the task that has been performed as part of the process. It should be noted, however, that such data is typically provided by the application itself and may not be provided for all applications. In addition, data such as an activity ID, user selection and input may be data internal to a program and may not be provided to other programs. Thus, some of the shortcomings of many process-mining procedures may be rooted in the lack of complete data/information on, e.g., multi-program processes; and the crucial part that a process must be chosen manually as a potential candidate for process automation in advance.

Some recent approaches may allow recording low-level event data that may not be associated with a specific process (e.g. case ID) or activity, but rather with a desktop window which has a name and with a program or application operating the window (e.g. an internet browser)—and then identify routines and processes based on, e.g., unsupervised-learning-based analysis of recorded data. Such broad data gathering process may mitigate the two shortcomings noted above. However, approaches based on using noisy and untagged user desktop actions as input data pose a great challenge in the context of grouping discovered routines into meaningful maps describing processes that may be chosen as candidates for automation. To this end, unsupervised learning automation discovery procedures may employ a probabilistic approach or framework to analyze the input data and identify automation opportunities of high ROI. However, a particular such approach often fails to satisfy an ideal cost-to-performance ratio—thus either requiring an additional, manual automation discovery procedure for identifying additional automation opportunities, or being formidably computationally costly.

SUMMARY OF THE INVENTION

A system and method may identify computer-based processes which may be candidates for automation. Embodiments of the invention may involve a semi-supervised approach for identifying processes as automation opportunities. A set of transitions connecting pairs of routines within a process, each routine representing a series of computer actions or received user input on a computer desktop system, may be received as input. Each transition may include a transition probability, which may or may not have been derived from instances of the corresponding pair of routines in a dataset of computer actions or received user input on a computer desktop system. Transition probabilities for each pair of routines connected by a transition may be calculated or recalculated based on a set of instances of the process (e.g., in a dataset of computer actions) using a dynamic time-window optimization technique or procedure, where transition times may be measured for a plurality of instances of a first and second routines of a given pair of routines, and where statistical distributions—including, for example, a cumulative distribution of transition times—may be calculated and used for deriving one or more time windows, which may describe a predetermined percentile (e.g., the $70^{th}$ percentile) of the measured transitions. The appropriate time window may, in turn, be used for estimating a transition probability for the pair of routines under consideration.

Following a transition probability calculation or recalculation, embodiments of the invention may update a process with newly calculated probabilities (replacing, for example, old transition probabilities with newly calculated ones). In some embodiments, the input set of transitions and routines may be generated by a user or business analyst using a dedicated graphical user interface (GUI). The user may further apply or assimilate a plurality of predefined thresholds and constraints, which may be employed as part of the calculation or recalculation procedure.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features, and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIGS. 2-6 depict an example GUI visualization of a process comprising multiple routines which may be used in some embodiments of the invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Embodiments of the invention may allow applying a semi-supervised automation discovery module or component on top of an unsupervised automation discovery procedure, in order to improve the identification and discovery of automation opportunities of business processes expected to have a significant return of investment (ROI). Embodiments may allow receiving user edits to a process being a candidate for automation and assigning, calculating or recalculating transition probabilities between routines included in the edited process based on the edits and according to a plurality of data describing user actions. Embodiments may make use of a dynamic time window optimization probabilistic framework for the recalculation of transition probabilities.

Figure 1:
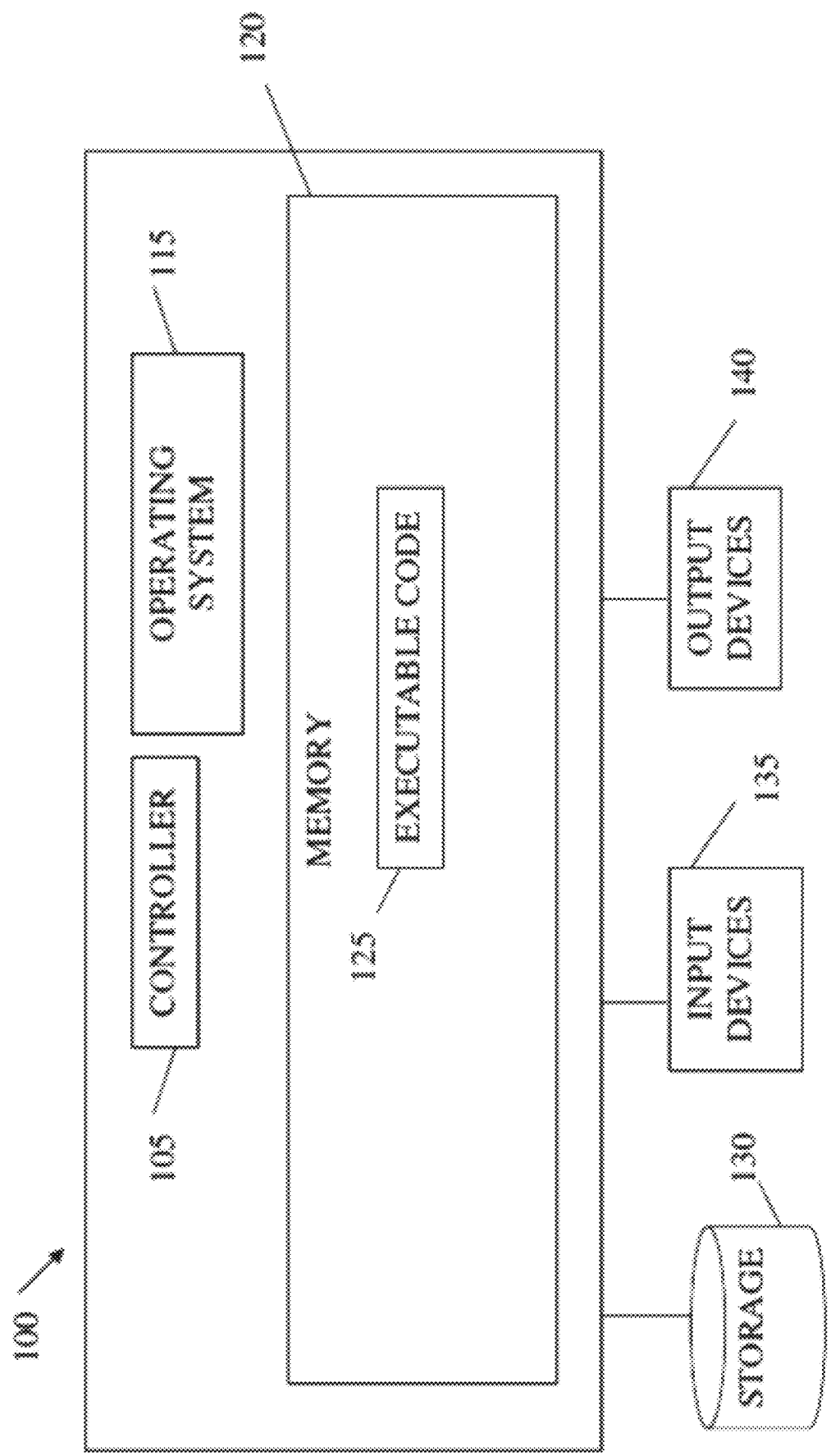
FIG. 1 is a high-level block diagram of an exemplary computing device which may be used with embodiments of the invention.
Figure 2:
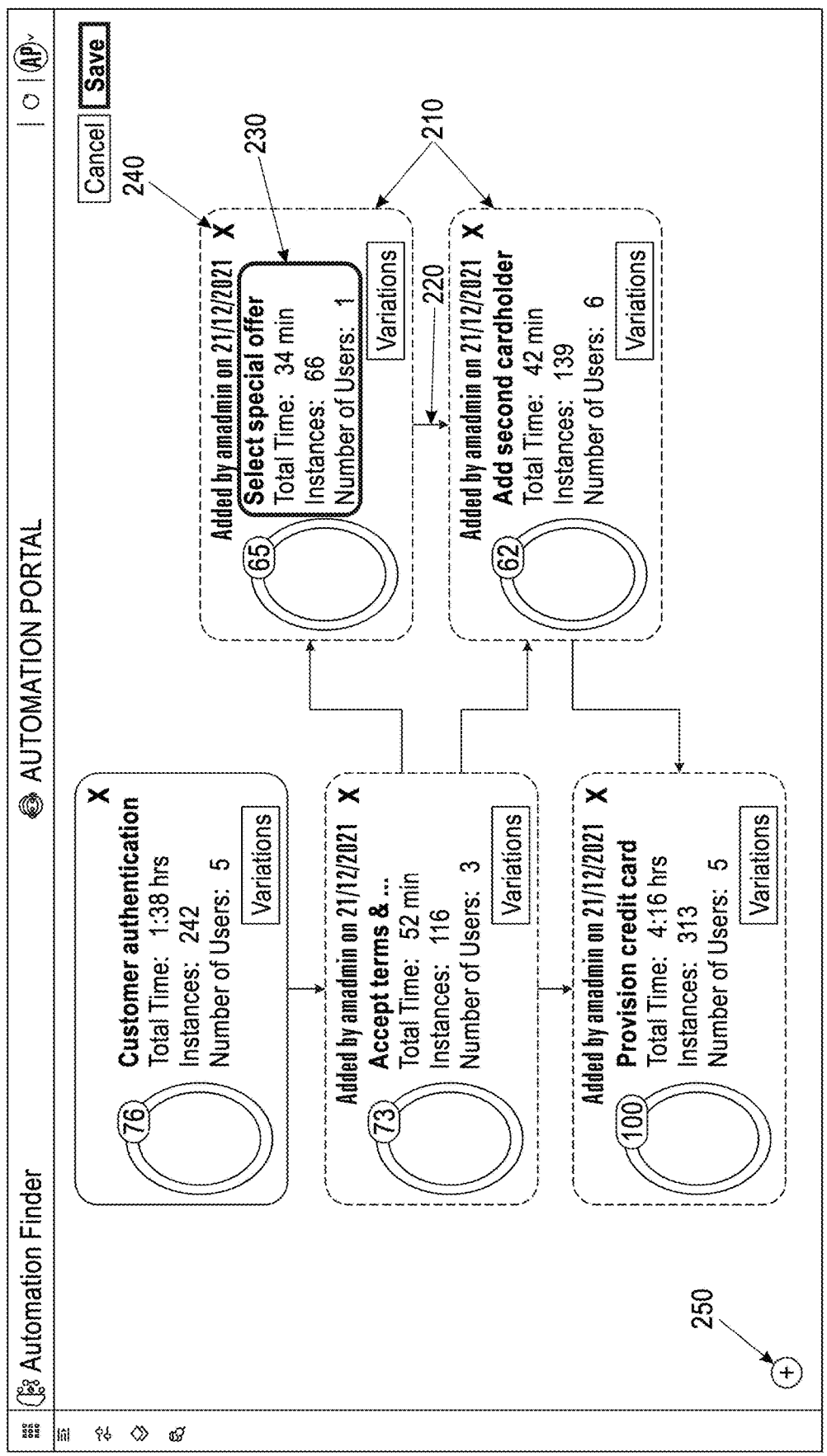

FIG. 1 shows a high-level block diagram of an exemplary computing device which may be used with embodiments of the invention. Computing device 100 may include a controller or processor 105 that may be, for example, a central processing unit processor (CPU), a chip or any suitable computing or computational device, an operating system 115, a memory 120, a storage 130, input devices 135 and output devices 140 such as a computer display or monitor displaying for example a computer desktop system. Each of the procedures and/or calculations discussed herein may be or include, or may be executed by, a computing device such as included in FIG. 1, although various units among these modules may be combined into one computing device.

Operating system 115 may be or may include any code segment designed and/or configured to perform tasks involving coordination, scheduling, arbitration, supervising, controlling or otherwise managing operation of computing device 100, for example, scheduling execution of programs. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may store for example, instructions (e.g. code 125) to carry out a method as disclosed herein, and/or data such as low level action data, output data, etc.

Executable code 125 may be any executable code, e.g., an application, a program, a process, task or script. Executable code 125 may be executed by controller 105 possibly under control of operating system 115. For example, executable code 125 may be one or more applications performing methods as disclosed herein, for example those of FIGS. 2,4, 7-8, and 10 according to embodiments of the invention. In some embodiments, more than one computing device 100 or components of device 100 may be used for multiple functions described herein. For the various modules and functions described herein, one or more computing devices 100 or components of computing device 100 may be used. Devices that include components similar or different to those included in computing device 100 may be used, and may be connected to a network and used as a system. One or more processor(s) 105 may be configured to carry out embodiments of the invention by for example executing software or code. Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data such as user action data or output data may be stored in a storage 130 and may be loaded from storage 130 into a memory 120 where it may be processed by controller 105. In some embodiments, some of the components shown in FIG. 1 may be omitted.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100, for example, a wired or wireless network interface card (NIC), a modem, printer or facsimile machine, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

Embodiments of the invention may generally be applied to analyzed data (e.g. low-level user action information items) describing actions of human-computer interaction, such as user input events or actions to a graphical user interface (GUI) and used in, e.g., an automation discovery procedure. Such an example procedure example such procedure (to be denoted AD herein) used as part of the Automation Finder system and associated automation framework by NICE, Ltd. will be used as a non-limiting example throughout, although those skilled in the art will recognize that the invention may as well be applies to different procedures and approaches as well.

A low-level user action as used herein (e.g., as used in automation frameworks and procedures such as AD) may refer both to the action itself, typically input by a user received by a computer, and the data that describes such an action, and in addition a generalized description or name for the action which applies to multiple specific instances of the same action or similar ones (in terms of their functionality). While the present disclosure will be focused on such lower-level user action, it should be noted that embodiments of the invention may also be applied to different kinds of actions or tagged/untagged data describing user actions which may be, e.g., sorted by execution time.

A low-level user action or low-level user action item may be for example a mouse or other pointing device click, a keyboard input to a text field, a cut command, a paste command, a certain keystroke or set of keystrokes (e.g. ctrl-P, alt-F1, etc.). Data describing such user actions (e.g. a low-level user action item) may include for example the type or description of action item or an input item description (click, cut, paste, text entry, etc.); action component details (e.g. the title of window item to which input is applied, e.g. the name of the text field having text entered; the title of the button or control being clicked on, etc.); a user name or ID (e.g. the name of ID of the person providing the input or logged in to the computer or terminal); a time or timestamp of the action; screen window information such as the title of the screen window into which data is entered or on which the relevant data is displayed, and the name of the program or application executing with which the user is interacting (e.g. the program displaying the window such as the Internet Explorer browser).

A window may be for example a defined sub-area of the screen which may typically be resized and moved by a user, in which data is displayed and entered for a particular task or software program. For the point of view of the computer by which a window is displayed, a window may be a graphical control element including a visual area with a graphical user interface for the program it belongs to, typically rectangular. A window typically has a name displayed, typically at its top—for example, a window allowing a user to edit a text document may have a name or title including the filename of the document and the program being used to edit the document. A window may be related to two different software programs: the name of the program or application executing the window, such as a browser such as Internet Explorer; and a remote or local program which controls or owns the substance of the window.

The local or remote program executing the substance of the window may not provide adequate data, and thus embodiments may capture low level action data instead. In many cases, the name or title for a window may be accessible from the OS of the computer executing the program owning or displaying the window, while the program owning or displaying the window may not allow or provide access regarding its own name, function etc. via system-specific event logs.

A system collecting low-level user action data and/or information, e.g., as part of the AD framework, may be illustrated in the context of a contact center, although embodiments of the invention may be used in other contexts. In such center, a number of human users such as call-center agents may use agent terminals which may be for example personal computers or terminals. Terminals may include one or more software programs to operate and display a computer desktop system (e.g. displayed as user interfaces such as a GUI). In some embodiments, software programs may display windows, e.g. via the desktop system, accept user input (e.g. via the desktop system) and may interface with server software, e.g. receiving input from and sending output to software programs. Client data collection software, e.g., the NICE RT™ Client software, an Activity Recorder or Action Recorder, may execute on or by the terminals and may monitor input to different programs running on them. For example, client data collection software may receive, gather, or collect a user's desktop activity or actions, e.g., low-level user action information or descriptions, and send or transmit them to a remote server, e.g., a NICE RT™ Server.

The client data collection software may access or receive information describing user input or actions via for example an API (application programming interface) interface with the operating system and/or specific applications (e.g., the Chrome browser) for the computer or terminal on which it executes. The remote server may collect or receive data such as user action information or descriptions, combine actions into a file, and export them as for example JSON (JavaScript Object Notation) files via for example an HTTPS (Hypertext Transfer Protocol Secure) connection to an automation finder server, which may receive and store action data and other data in a database, which may then be processed. In some embodiments the remote server and automation finder server may be contained in or executed on the same computing device, unit, or server. One or more computer networks (e.g., the internet, intranets, etc.) may connect and allow for communication among the components of an automation discovery or finding system (such as the remote and automation finder servers, the agent terminals, and so forth). Agent terminals may be or include computing or telecommunications devices such as personal computers or other desktop computers, conventional telephones, cellular telephones, portable or tablet computers, smart or dumb terminals, etc. Terminals and servers discussed herein may include some or all the components such as a processor shown in FIG. 1.

In some embodiments, the client data collection software may operate with permission of, e.g., an organization's operating terminals, and may collect for example user input event data, and may be tuned or configured to not collect certain data. For example, a user may configure the data collection software to operate on or collect data from only certain windows and applications (e.g. windows with certain titles, or certain URLs (uniform resource locators) or website addresses), and may ignore for example windows accessing certain URLs or website addresses. The client data collection software may collect data from Internet based windows and/or non-Internet based windows.

In some embodiments, low-level user action data collected may be in the form of Windows Handles and their properties as provided by Windows API (e.g., Win-32). The event logs files describing these data collected desktop events may be exported in a JSON format, using appropriate files, and transferred to a server. The data may include for example event or action time (e.g. start time, but end time may also be included); user details (e.g. name or ID of the person providing the action input or taking the action in conjunction with the computer); action details or description (e.g. mouse-click, text-input, keyboard command, etc.); the details of the window in which the action takes place, such as the window size, window name, etc.; the name of the program executing the window; and text if any that was input or submitted (in text actions). Other or different information may be collected. User details or ID may help to tie together actions to related processes and infer process orderings.

Each low-level user action may be described in a database by several fields of the action data such as action time, user details, action details, window name and size, program executing the window, and whether text was entered. A generalized name or description may also be created and associated with the action, where the generalized name has certain specific information such as user ID, timestamp, and other tokens in the data (e.g., names, dates, etc.) removed or replaced with generalized information. Multiple specific instances of similar actions may share the same generalized name or description. Thus, actions may be stored and identified by both identifying the specific unique (within the system) instance of the action, and also a generalized name or description.

Table 1 below illustrates example action data for an example scenario in which an agent logs in into an ordering system; as with other data used in examples other specific data and data formats may be used. The agent may open or start the ordering system, enter her or his username and password in a login screen, and then continue working on a case e.g., move to the new orders screen. This includes several low-level user actions as described in Table 1. First, the agent, identified as Agent1 in the User column, at time 10:00:00, clicks twice using a mouse left-click on the MyOrderingSystem icon on the desktop display (window Desktop indicates the desktop on a Windows style system, where windows may be displayed on the desktop). The login screen or window may open or pop up (named per collected data MyOrderingSystem-Login), and the agent may enter his username (e.g. "Agent1") and password (e.g. "myPassword") into the fields identified in the Action column, and successfully log in. The text collected as data may be the entered agent name and password. The agent may then click on mouse left-click on the NewOrders view inside the MyOrderingSystem to display new orders.

and screen window information such as title or name. (e.g., as computer processes in this context may be displayed as windows, each window may have a title or name which may describe the user-facing application to which the user provides input.) Actions may be stored and identified both identifying the specific unique (within the system) instance of the action, and also a generalized name or description that identifies the action in a way such that actions of similar functionality will have the same generalized name. Both the specific and generalized identification or name may be linked or stored together in the system. Sequential pattern mining may be applied to determine routines, each routine including a series of low-level user actions which are reoccurring in the data.

Routines may be grouped or clustered by, for example, representing each routine as a vector and clustering or grouping the vectors (e.g., by calculating a distance between routine vectors and then using an algorithm such as the known Louvain method algorithm). Each user action may be associated with or represented by a user action vector, and by extension each routine may be associated with a routine vector which may be calculated or generated from user action vectors associated with low-level user actions in the routine. The routine vectors may be grouped or clustered to create processes, which may be considered a task such as a business task that may be large enough and otherwise suitable for automation. Particular actions or a set of actions in the low-level user action data used for finding or discovering a given routine and/or process may otherwise be known as "instances" of the routine and/or process. For each process, an automation score may be calculated, for example based on the process instances in the low-level user action data (e.g., the same data on top of which the routines and process were abstracted). Based on this score, a user may create an automation process such as a bot which may automatically—e.g., via computer function—complete the process which previously was performed by a person interacting with a computer. Grouping identified or determined routines into business processes and calculating an automation score for a given process is known in the art.

TABLE 1

| User ID | Time | Window Name | Action Description or Type | Text Entered |
|---|---|---|---|---|
| Agent1 | 10:00:00 | Desktop | Left-Dbl-Clickon MyOrderingSystem | |
| Agent1 | 10:00:10 | MyOrderingSystem-Login | InputText on Username | Agent1 |
| Agent1 | 10:00:20 | MyOrderingSystem-Login | InputText on Password | myPassword |
| Agent1 | 10:00:30 | MyOrderingSystem-MainView | Left-Click on NewOrders | |

Data such as presented in Table 1 may generally be gathered or received from multiple physically distinct user terminals operated by multiple different users and is analyzed at a central location or server not at any of the user terminals (typically be a processor separate from terminal processors); however, data analysis may be performed at a user terminal which also collects user data. At for example a central server data received from the terminals describing the low-level user action information or items may be used to determine subprocesses, or routines, which may be for example a series of actions that repeat across the data, and possibly repeat across data divided into contexts. An item of information describing or defining a low-level user action may include for example an input type description (e.g., the type of action the user performed as input: mouse click, left click, right click, cut, paste, typing text, etc.), a user name, In unsupervised learning automation discovery procedures, a probabilistic component or module is often applied to the noisy data describing low-level user actions to organize it into routines and processes. In particular, AD associates a "transition probability" with a transition between a given pair of routines using, for example, the following formula (other formulas may be used):

$$Prob(S_1 \to S_2) = $$
$$Prob(\text{instance } s \text{ continued to some instance in } S_2 \mid s \in S_1) == $$
$$\frac{\sum_{s \in S_1} \text{instance } s \text{ continued to some instance in } S_2}{\text{all instances in } S_1}$$

where Prob($S_1 \rightarrow S_2$) indicates the probability or likelihood that instance "s" within the set of all instances in routine S_1, i.e., s E $S_1$ continued to S_2, such that there is some instance in S_2 which is a continuation of their execution. The operator $E_{s \in S_1}$ goes over all instances s in S_1. This may be measured by the sum of all instances s of the set of instances S_1 of a routine where instance s directly followed by any instance within S_2; this is then divided by the number of instances in S_1. The formula may measure for each specific actual instance of two routines the probability the individual entering input to carry out the routines from the first to the second subprocess. Some specific instances may indicate a probability the opposite of the final answer Prob, and thus typically all or many such available instances are input. From these probabilities the most likely ordered path may be created. Probabilities of an order or sequence within each pair of routines may be created, where a routine is a member of multiple pairs having probabilities created. From this knowledge, pairs themselves may be ordered, as the probability of a transition between the later member of each pair to the earlier member of a different pair may be known. Thus the pairs may be assembled into an ordered sequence which is the process. However, in many cases, a particular probabilistic approach or framework used in automation discovery procedure may fail to identify viable automation opportunities of significant ROI. In such cases, it may be beneficial to apply a semi-supervised automation discovery module or component on top of the fully unsupervised automation discovery procedure. Embodiments of the invention may make use of such semi-supervised approach as further described herein.

Some approaches used in the art (e.g., as part of the AD procedure) may output a report to be examined by a business analyst. The report may depict, for example, identified processes, routines, calculated automation scores (e.g., automation ROI estimates) as well as additional information derived from a database of low-level user actions. Embodiments of the invention may allow editing a process report, or visualization, or graph, and using the edits for the recalculation or identification of automation opportunities in the underlying dataset. In some embodiments, the editable report may be displayed and modified using a dedicated GUI to provide the user a quick and complete understating of the most significant automation opportunities. Such report may consist of a plurality of routines grouped into processes, where routines are displayed as nodes connected by links corresponding to transitions connecting pairs of routines, and where each transition may include a transition probability (e.g., as calculated using the AD approach; while action data may include for example timestamp information, timestamp data may not properly reflect the start and end times of a given routine. Thus, the order of routines may be inferred or calculated, for example as described herein. Identifying or determining the probability for a given routine A coming before or after another routine B defines transition, if occurring, between routines AB. A non-limiting example or illustration of transition probability as calculated by the AD approach can be seen for example in Table 2. In some embodiments of the invention, such probabilities may be for example represented as a table and stored in a database, e.g., in computer memory 115). A transition, in this context, may generally be data representing the sequential execution of an action or routine B following an action or routine A. The business analyst may manually modify the grouping of routines into processes, thus making use of the invention to better 'localize' the findings and identify business processes automation opportunities in the context of the customer domain and needs.

TABLE 2

| Transition | From Routine | To Routine | Probability | State Added by user/ removed by user/ Discovered by AF |
|---|---|---|---|---|
| 1 | 44 | 27 | 49% | Discovered |
| 2 | 22 | 44 | 20% | Added |
| 3 | 6 | 44 | 68% | Discovered |
| 4 | 6 | 22 | 31% | Discovered |

In some embodiments of the invention, the business analyst may use the GUI to edit, add, change, or delete routines or transitions connecting pairs of routines inside a plurality of processes—which may, e.g., be described in the report. User input from the analyst may cause the computer system to modify routines or processes accordingly. In such manner, novel processes may be derived or otherwise created from scratch based on the routines included in a given report. Embodiments may also allow the business analyst to remove or delete redundant processes that do not constitute valuable automation opportunities from the analyst's perspective. Embodiments of the invention may thus receive user edits (generated, for instance, using the GUI) which may correspond to a set of transitions connecting pairs of routines in the edited process; assign, calculate or recalculate transition probabilities for a plurality of transitions within the process based on the edits; and update the process based on the calculated transition probabilities. In some embodiments of the invention, a list of actions and/or routines of a plurality of updated processes or output automation may be implemented in an existing or newly created computer program, bot, or robot. This may be achieved for instance by translating the underlying lists of actions and/or routines of an output automation into a set of corresponding objects, which may be for example workflow steps functions and appropriate screen elements (a non-limiting example of such procedure may be, e.g., the translation of discovered processes and routines between the Automation Finder and Automation Studio tools used as part of the AD framework by Nice, Ltd). Such objects may then be compiled into, for example, .NET code which may include a set of instructions that may be executed by a bot at runtime—for example as a dynamic linked library as known in the art. In some embodiments, the bot may automatically execute the automated process under consideration without requiring further intervention by a user or business analyst. As a non-limiting example, an automated "input-text"-based text template process, where a particular, predefined string or piece of text is copied from one window or app onto another, different window or app may be first found according to the automation discovery recalculation procedure disclosed herein, and then implemented in a bot which may immediately be configured to perform the automated text-template-related process. In such manner, a fixed message may be for example sent as confirmation messages for the receiving of, e.g., an offer from vendors known to the organization, or requests and/or from clients known to the organization.

FIGS. 2-6 depict an example GUI visualization of a process comprising multiple routines which may be used in some embodiments of the invention. For example, in FIG. 2, blocks or nodes 210 denote a pair of routines within a process which may be connected by a link or arrow 220 which signifies a transition between a pair of routines. Blocks may, for example, include further details (element 230) about the corresponding routines, for instance their times and duration of execution, number of users executing a given routine, and number of occurrences/instances of the routine in the low-level user action data. Additional details may include a routine ID number and name. Other details and information may be used in other embodiments of the invention. The user or business analyst may, for instance, remove a given routine by clicking on the 'x' symbol on the top right of the corresponding node (element 240).

Additional routines may be added, for example, by clicking the '+' sign on the bottom left of the window (element 250)—and by searching for desired additions in a dedicated window (FIG. 3). Search results may be displayed and organized according to various sources of information, such as routine type (which may include, e.g., "Template"—which may be a routine corresponding to filling a form; "Copy-Paste" which may be a routine that primarily consists of copy-paste actions using for example strings or pieces of text; "Data Entry" which may be a routine that primarily consists of text-input actions; and "Other", which may for example be a routine that does not primarily consist of actions of a specific type, such as text- or string-related as illustrated for preceding routine types; element 310), routine name (element 312), an automation score calculated for adding the particular routine to those already existing in the process under consideration (e.g., as calculated in AD as known in the art; element 314), the number of occurrences for the routine in the low-level user action data (element 316), the average time of execution (element 318), the total time of execution for all routine instances in the low-level user action data (element 320), applications including or operating the routine (element 322), a unique routine identifier (element 324), process name (element 326), and so forth. Additional and/or different fields and information may be employed in other embodiments of the invention. Routines may be chosen by, e.g., checking the boxes on the left column (element 330)—and added to the process by clicking the 'Add to Process" button on the upper right edge of the panel (element 340).

Figure 4:
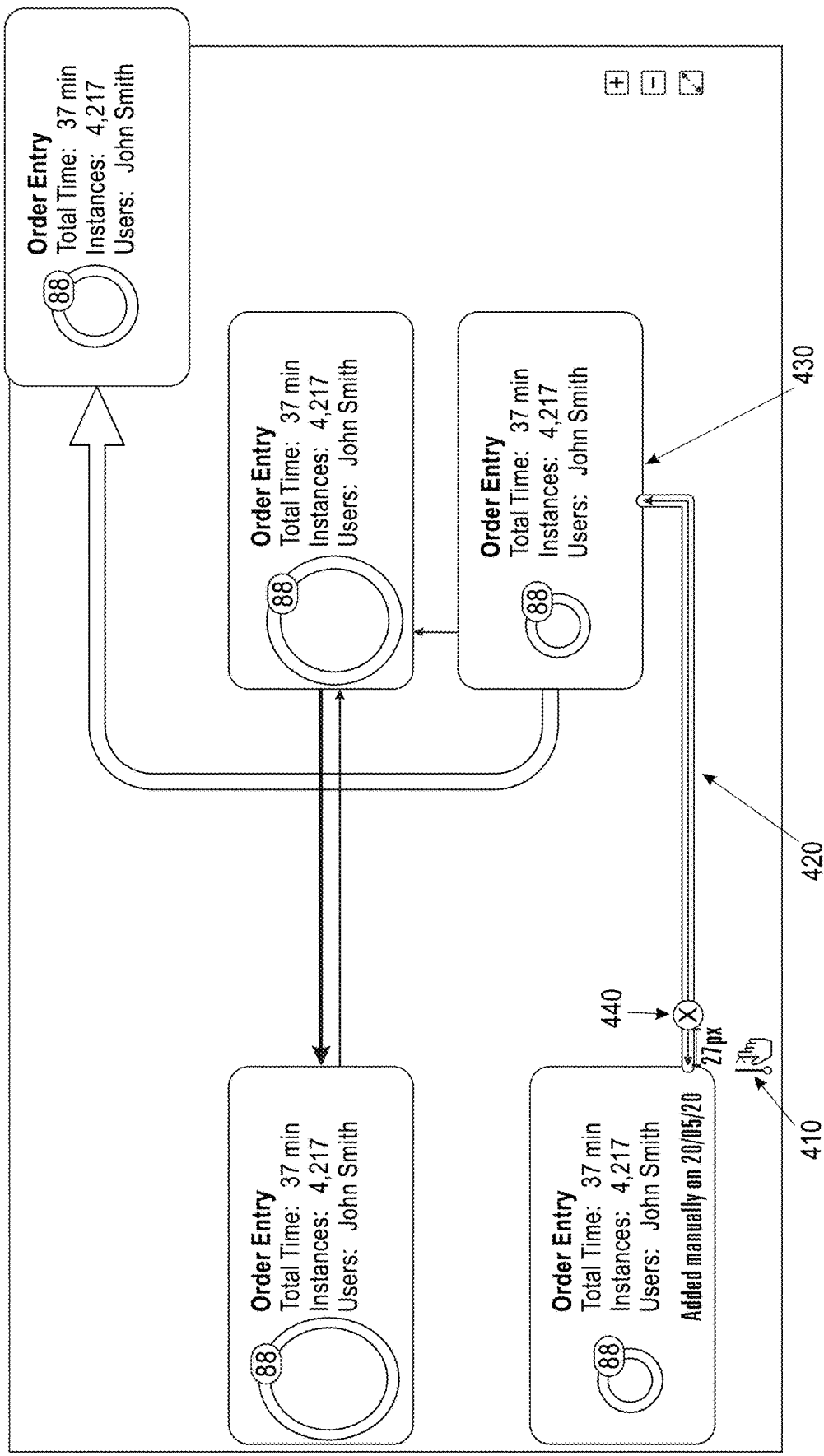

FIG. 4 is an example visualization presented to a user that illustrates that routines within a process may be connected by transitions, e.g., by clicking on one of the vertices of a routine node (element 410) and 'dragging' a resulting arrow (element 420), which signifies a transition as described herein, onto another, different routine (element 430). Added transitions may be deleted, e.g., by clicking an 'x' sign (element 440) found on top of the added transition's arrow. Transitions connecting each pair of routines may comprise or include a transition probability—e.g., calculated or recalculated using a dynamic time-window optimization approach as described herein, derived prior probabilistic calculations carried out as part of a prior automation discovery procedure (such as AD), or otherwise set as a predefined value (for example, in case no transition probability has been calculated during such procedure) according to user preferences and/or settings, which may differ in various embodiments of the invention.

In some embodiments of the invention, a report—which may include a list of all calculated/recalculated processes derived from low-level user action data (e.g., from instances of the process executed by a plurality of users)—may be displayed in a dedicated window (FIG. 5). The user or business analyst may search and select processes by checking the corresponding boxes on the left column in the window (element 510). Search results may include or be organized according to, for example, process name (element 512), an automation score calculated for the process (e.g., as calculated in AD and other approaches known in the art; element 514), total time required for process execution (element 516), applications including or operating the process (element 518), the number of unique users executing the process in the low-level user action data (element 520), the number of routines included in the process (element 522), additional notes (which may for example be entered manually by a user; element 524), and an estimation of the savings offered to the organization by automating the process (element 526); such estimation techniques and procedures are known in the art.

Figure 6:
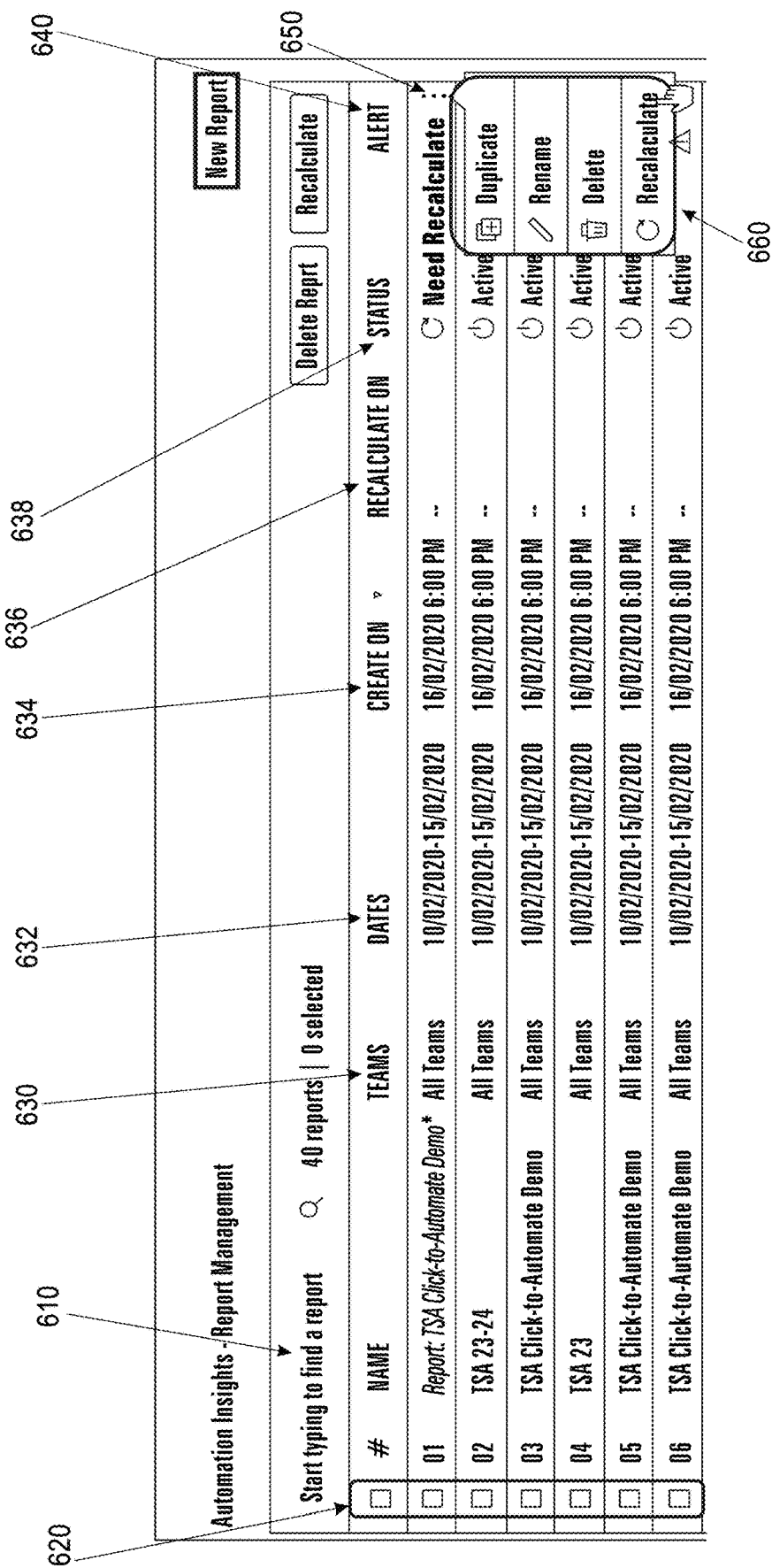

Some embodiments of the invention may include an additional window displaying a plurality of reports assembled or calculated for a plurality of processes and/or routines based on low-level user action data (FIG. 6). As, for example, with graphical window representation of routines and processes described herein, a report window may enable a user or business analyst to search (element 610) and select different reports by checking the corresponding boxes on the left column in the window (element 620). Search results may include or be organized according to different information, such as teams of users to which the report was delivered or which are responsible for generating the low-level user action data analyzed in the report (element 630), the dates during which the underlying user action data was collected (element 632), the date on which the report was created (element 634), the day on which user-edited processes included in it were calculated or recalculated according to embodiments of the invention and as described herein (element 636), a report status describing whether the report is considered "active" or needs to be recalculated (in some embodiments, a given report may for example be considered active if it is currently used or applied to, e.g., a dataset or user actions in order to discover automation opportunities as described herein. In contrast, if the report is for example still being constructed or established by a business analyst, and/or did not undergo or complete a transition probability calculation procedure based on corresponding user action data—then the report may, e.g., considered and/labeled "inactive" or "needs recalculation"; element 638), and additional notes and alerts (element 640). In some embodiments, the user or business analyst may right-click or click the three-dot symbol on the right side of the screen (element 650) to open a drop-down menu (element 660) which allows renaming, deleting, or recalculating entire reports on their constituting processes and routines.

Alternativ graphical or data representations of various user edits, including, but not limited to, adding or deleting routines or transitions, adding new processes or deleting existing ones, marking a process as requiring recalculation, and the like—may be used in other embodiments of the invention. Those skilled in the art would recognize that the graphical example provided herein and illustrated in FIGS. 2-6 are non-limiting.

User edits as used herein may be represented or input to a computer system as a set of transitions connecting pairs of routines within a given process, or to multiple sets of such transitions corresponding to a plurality of processes—which may be, for example, included in a report. A transition probability included in a given transition may have been previously calculated, for example, using the AD framework based on the instances (e.g., executions by a plurality of users) of the process in the low-level user action data. In case no such probability has been calculated, embodiments of the invention may set or assign a predetermined value as the transition probability based on user edits (for example, for a pair of user-added routines A, B which have not previously been found in the low-level user action data—and therefore were not assigned a probability during, e.g., an AD procedure—a predefined value (for example 20%) may be set as the transition probability from A to B. This value may later be replaced by a recalculated transition probability obtained using, e.g., a dynamic time-window optimization as disclosed herein). User edits to a process and/or a report by the business analyst may, for example, be saved in a JSON file describing the process. The use of such file format for describing a process is known in the art; those skilled in the art would recognize, however, that various alternative file formats may be used in other embodiments of the invention. As an illustrative example, the contents of an JSON file describing an edited process as part of a training of a customer-relationship-management (CRM) application, which requires recalculation according to, e.g., a business analysist's feedback, may be for example:

```
"processFeedbackDetails": [
    {
        "processDetails": {
            "processId": 0,
            "name": "nice com get touch training crm application",
            "numberOfRoutines": 3,
            "createdByUser": false,
            "deleted": false,                    },
        "routineFeedbackDetails": [
            {
                "routineId": 2,
                "deletedByUser": false,
                "newlyAddedByUser": false            },
            {
                "routineId": 3,
                "deletedByUser": false,
                "newlyAddedByUser": false            },
            {
                "routineId": 5,
                "deletedByUser": false,
                "newlyAddedByUser": false            }
        ],
        "transitionFeedbackDetails": [
            {
                "routineIdFrom": 2,
                "routineIdTo": 3,
                "deletedByUser": false,
                "newlyAddedByUser": false            },
            {
                "routineIdFrom": 3,
                "routineIdTo": 5,
                "deletedByUser": true,
                "newlyAddedByUser": false            }
        ]
    }
],
"routineDocuments": [
    {
        "name": "Copy, Paste and other actions ( ) in NICE.COM, Training CRM Application",
        "originalName": "Copy, Paste and other actions ( ) in NICE.COM, Training CRM Application",
        "routineId": 2,
        "score": 75.13505652209239,
        Agents: "Matthew", "Matthew", "Matthew", "Matthew", "Hughes", "Matthew","Matthew","Hughes","Hughes","Hughes"
        Start-times: "1635316248503", "1635317278221", "1635321335672", "1635322298471", "1635329935064", "1635332046082", "1635335364573", "1635336342381", "1635340078563", "1635341110334", "1635342081267"
        End-times: "1635316258658", "1635317287724", "1635321345119", "1635322307478", "1635329943050", "1635332060913", "1635335377264", "1635336353576", "1635340087899", "1635341124856", "1635342091132"},
{
        "name": "Copy, Paste and other actions ( ) in OUTLOOK, NICE.COM, WINWORD",
        "routineId": 3,
        "numOfOccurrences": 27,
        Agents
        Start-times: "1635316248503", "1635317278221", "1635321335672", "1635322298471", "1635329935064", "1635332046082", "1635335364573", "1635336342381", "1635340078563", "1635341110334", "1635342081267"
        End-times: "1635316258658", "1635317287724", "1635321345119", "1635322307478", "1635329943050", "1635332060913", "1635335377264", "1635336353576", "1635340087899", "1635341124856", "1635342091132"},
{
        "name": "Paste, Copy, Freetext and other actions ( ) in OUTLOOK, NICE.COM",
        "routineId": 5,
        Agents: "Hughes","Hughes","Hughes","Hughes","Hughes","Hughes","Hughes","Hughes","Hughes","Hughes"
        Start-times: "1635316248503", "1635317278221", "1635321335672", "1635322298471", "1635329935064", "1635332046082", "1635335364573", "1635336342381", "1635340078563", "1635341110334", "1635342081267"
        End-times: "1635316258658", "1635317287724", "1635321345119", "1635322307478", "1635329943050", "1635332060913", "1635335377264", "1635336353576", "1635340087899", "1635341124856", "1635342091132"}
``` where different entries indicate, inter alia, the number of routines in the process under consideration, whether the process or routines have been deleted or newly-added by a user (e.g., the business analyst)—thus flagging a process as requiring calculation or recalculation, which pairs of "to" and "from" routines are connected by a transition, the application from which low-level user actions were collected to form, group, cluster, or establish the pre-edited routines or process, the agents who executed the low-level user actions, and the latters' start and end times. Note that particular labels (e.g., "routineIdFrom", "numOfOccurrences", etc.) within the example file are self-explanatory and may easily be understood by those having ordinary skill in the art. Other JSON file structures, or different file formats may be used in different embodiments of the invention. User edits, e.g., a set of transitions connecting pairs of routines provided in JSON format, may be received by embodiments of the invention, and taken as input for a transition probability calculation or recalculation procedure as further disclosed herein.

In some embodiments, flagging a process as requiring recalculation may also be indicated on the GUI used by the business analyst, e.g., as depicted in FIG. 6 for a report (by element 638).

In some embodiments of the invention, a recalculation procedure may be performed to a plurality of processes described or analyzed in a report. In such procedure, which will be referred to as 'report recalculation' herein, the user or business analyst may edit a plurality of processes (e.g., two or more of the processes) within a given report—and then trigger, send, flag, or mark the report as requiring recalculation. In some embodiments, this may trigger the calculating of transition probabilities based on the edits. Embodiments of the invention may then receive user edits (e.g., in the form of a set of transitions connecting pairs of routines) as input and recalculate all changed processes (e.g., using a dynamic time-window optimization as described herein) and assimilate, or apply, or incorporate user constraints (e.g., add/remove particular routines and/or transition from the process) in an iterative manner—for example by serially recalculating one changed process after another, then updating all recalculated processes based on the calculated or recalculated transition probabilities, then assimilating or applying or incorporating user constraints on updated processes (e.g., on one or more of the transitions between connected pairs of routines within a plurality of processes), and then producing a corresponding, updated report (which may, for example, still be based on the same dataset of low-level user actions as the original report). In other embodiments of the invention, the user or business analyst may edit and accordingly trigger the calculation or recalculation for each process separately, e.g., independently from a report dedicated to a set of processes derived from low-level user actions which were all recorded throughout a particular timeframe.

Figure 7:
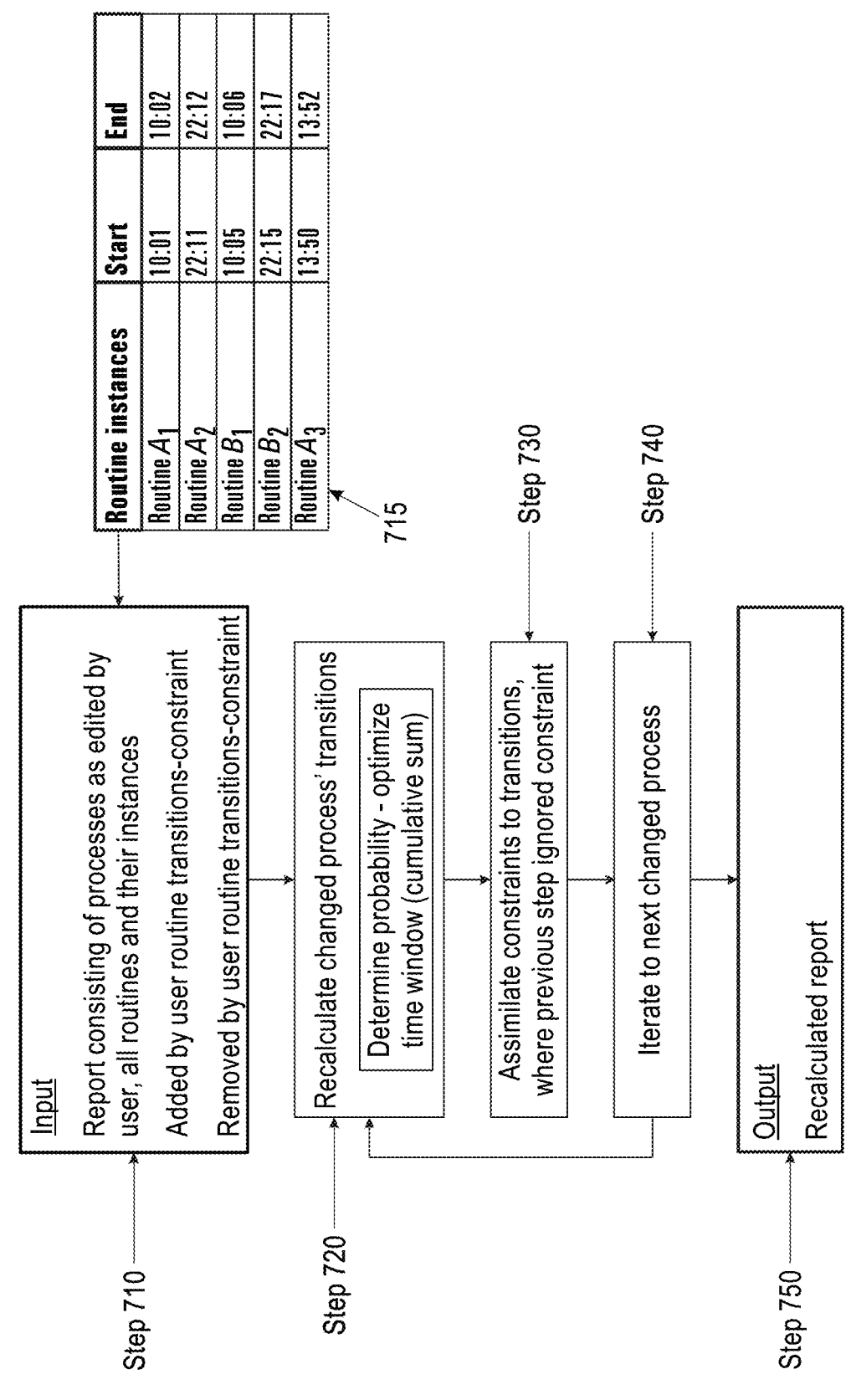
FIG. 7 is an example report recalculation procedure based on user's feedback according to some embodiments of the invention.

FIG. 7 shows an example report recalculation procedure 700 based on user's feedback according to some embodiments of the invention. In step 710, an edited report, consisting of a plurality of processes as edited by a user or business analyst may be received as input—e.g., as a JSON file including all instances of the relevant routines (e.g., in addition to their starting and ending times) within the process under consideration as previously calculated using an unsupervised automation discovery approach, such as illustrated in a dedicated table (element 715). The input may include user constraints such as, for example, adding or removing a particular routine. The edited process transitions and transition probabilities included or associated with them may then be recalculated using, e.g., an optimized time window probabilistic approach as further disclosed herein (step 720; alternative approaches and algorithms may be used in other embodiments of the invention). User constraints may then be applied to transitions in the recalculated process (step 730). That is, while probability-based calculation or recalculation step 720 may ignore some user constraints regarding transitions between pairs of routines in a given process—e.g., by calculating all transition probabilities between all subsequent pairs of routines in the edited process (e.g., including those added by the user or business analyst)—constraint assimilation or inclusion step may enforce such user constraints on top of results from probabilistic calculations. In such manner, a transition probability between a given pair of routines may be set to a user-determined value (for example, a business analyst may determine a transition probability of 80% between routines A and B; while a dynamic time-window-optimization-based probabilistic calculation may result in a transition probability (e.g. of 50%) from A to B, such calculated value may be replaced by the user-determined value (e.g. of 80%) during constraint assimilation step 730). Other values may be used. Once a given process has been updated with probabilistic calculation results and after user constraints have been enforced (e.g., following steps 720-730), the same steps may be executed or applied to the next process in the report being recalculated (step 740), such that the procedure is carried out iteratively on all processes included in the report under consideration. The output of the recalculation procedure may then be an updated report (produced, e.g., at the final step 750) describing all recalculated and updated processes according to a given dataset of low-level user actions.

While unsupervised approaches for calculating transition probabilities currently used in the art are calculated using a probability estimator with a predefined time window, a different approach may be helpful in a context where a user indicated changes in a process already examined as candidate for automation. In such manner, since a change in the way one transition is calculated for any routine in a process may affect the way other transitions between this routine and any other routines are calculated, then all possible transitions between any ordered pair of routines are recalculated in order to correctly identify automation opportunities according to post-discovery edits by a user. Thus, embodiments of the invention may employ dynamic time-window optimization techniques in order to estimate transition probabilities between pairs of routines (to generally be denoted routines A and B herein). In some embodiments of the invention, transition probabilities for each pair of routines within the process may be calculated of estimated. The process under consideration may subsequently be updated based, e.g., on calculated or recalculated transition probabilities—such that original such probabilities, which may be for example derived from prior AD procedures or set to a predefined value, may be replaced by those calculated using the dynamic time-window optimization techniques as disclosed herein.

Figure 8:
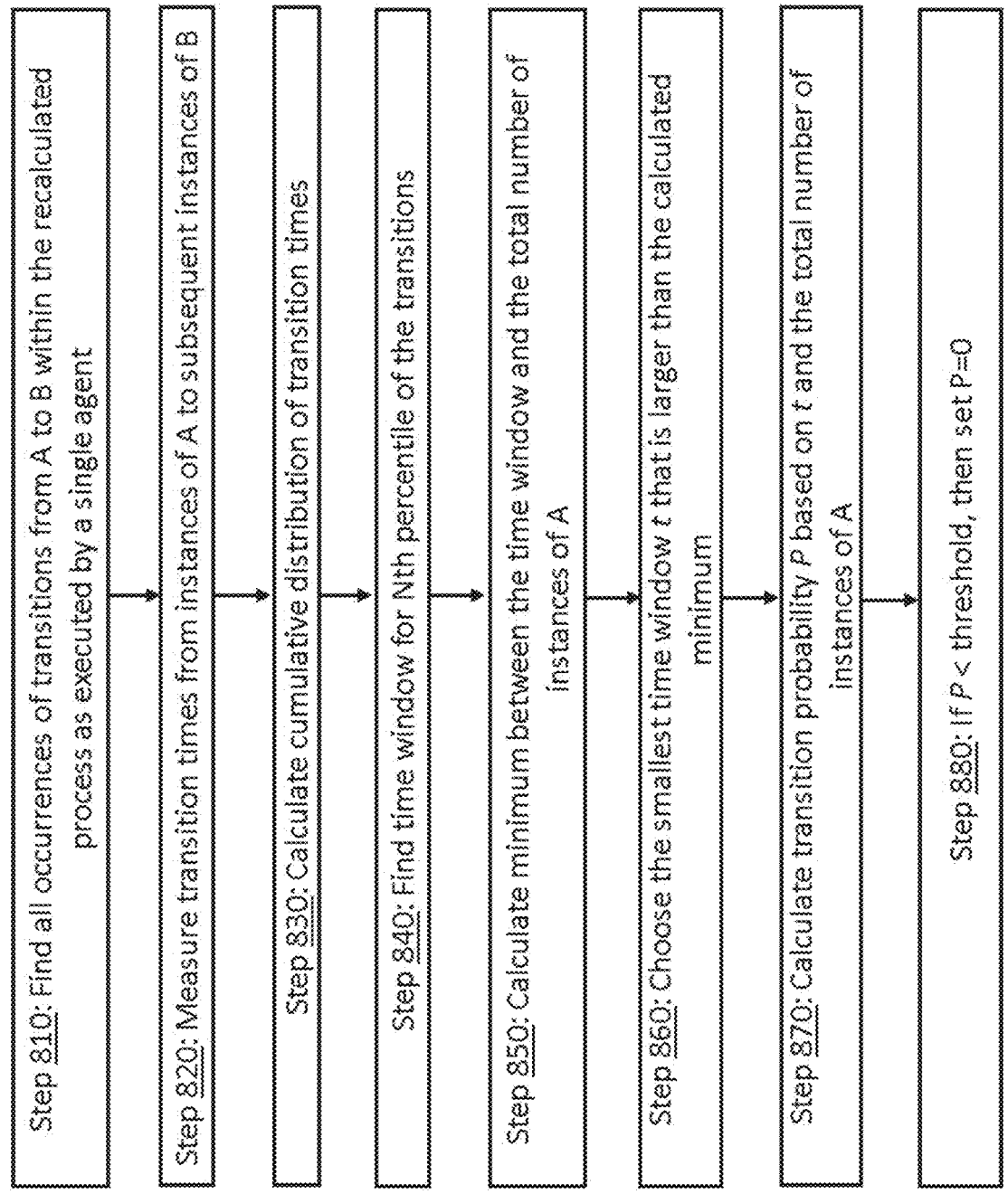
FIG. 8 is an example transition probability calculation or estimation procedure for a pair of routines using dynamic time window optimization according to some embodiments of the invention.

FIG. 8 illustrates an example transition probability calculation or estimation procedure 800 for a pair of routines (e.g., pair of routines connected by a transition edited by a business analyst as described herein) using dynamic time window optimization according to some embodiments of the invention. At step 810, all instances of transitions from routine A to routine B, which may be a connected pair of routines, within the recalculated process, e.g., as executed by a given agent are collected. In other embodiments of the invention, instances executed by a plurality of different users may be collected in this stage. A set of transition times from the end of every collected instance of routine A to the start of the subsequent collected instance of routine B may then be measured for the collected instances (step 820). Other ways to measure transition times may be used. In some embodiments, transition times may only be measured for collected instances of routine B found within a predefined time window from routine A, while collected instances found outside this time window may be discarded. Time windows used for such purpose may be chosen, e.g., from an appropriate list or set of time windows for example based on the pair of routines under consideration. Different time windows may then be chosen for different pairs of routines and corresponding transitions.

Figure 9:
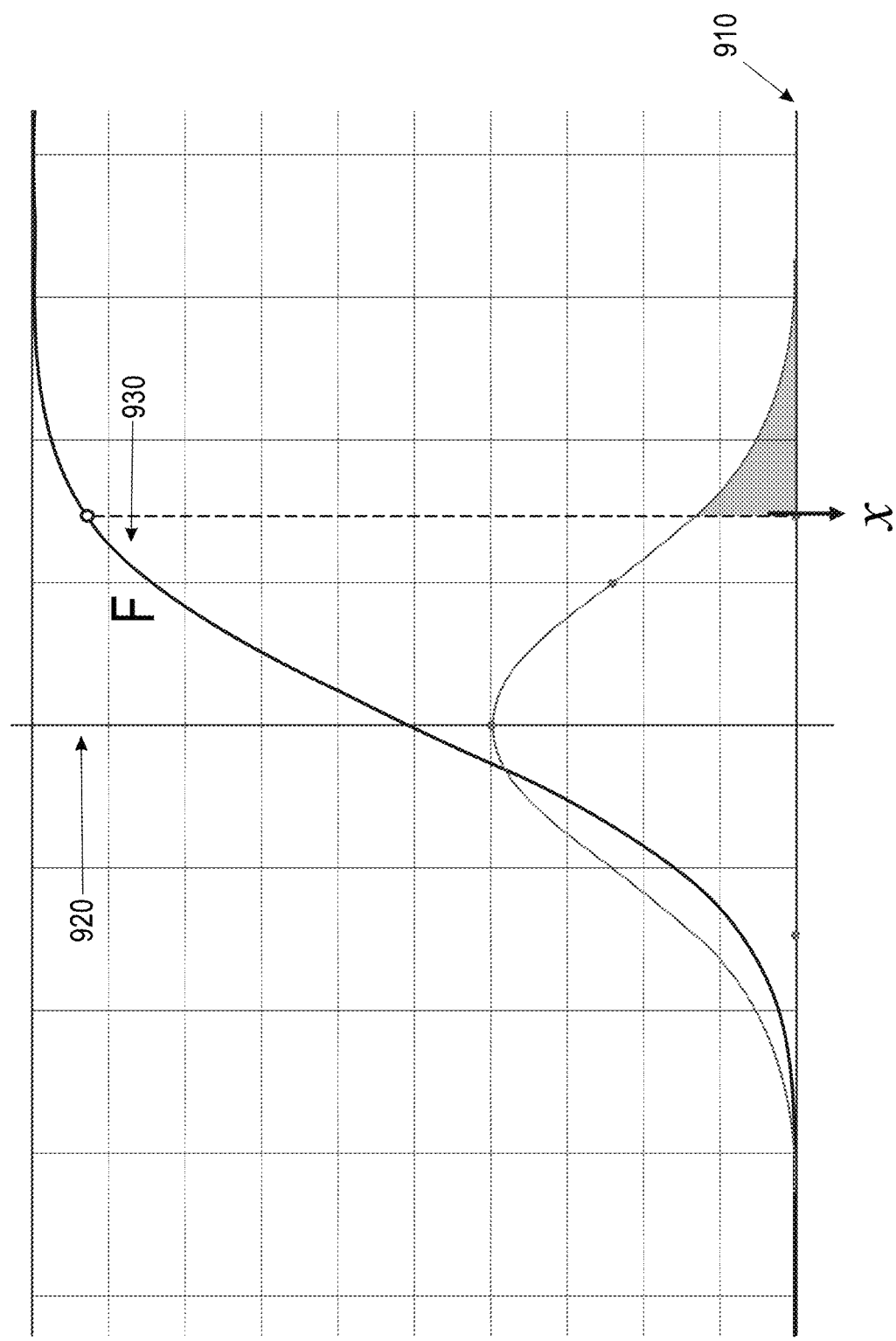
FIG. 9 is an illustration of a cumulative distribution of measured transition times for a given pair of routines which may be used in some embodiments of the invention.

The measured set of transition times may then be used for calculating transition probabilities, e.g., via calculating a cumulative distribution of transition times (step 830). In some embodiments, measured set of transition times used for the calculation of the cumulative distribution are assumed to be normally distributed. In such manner, the cumulative distribution may be overlayed and presented on top of a corresponding normal distribution graph, as demonstrated in FIG. 9—which illustrates an example cumulative distribution based on measured transition times for a pair of routines, which may be used in some embodiments of the invention—where the x-axis (element 910) is in time units, the y-axis (element 920) denotes the number of transition occurrences or instances of measured time x, and $F_x(x)$ denotes the calculated cumulative distribution for the pair of routines under consideration (element 930). This effectively means that—

$$F_x(x) = P(X \le x)$$

where x is a time value and X is the number of transitions from A to B that occur within a timeframe smaller than x. Alternative and/or additional probabilistic assumptions and/or statistical distribution types may be used and/or calculated in other embodiments of the invention. In some embodiments, both cumulative and normal distributions may be calculated and/or plotted to assign, calculate, or recalculate transition probabilities as further disclosed herein. In other embodiments, a plurality of statistical distributions of measured transition times (e.g., between various connected pairs of routines in an edited process) may be calculated based on measured transition times, such that a given transition probability may accordingly be assigned or calculated based on the distributions (e.g., based on low-level user action data corresponding to a plurality of routine pairs), as well as based on a plurality of measured transition times, and on a plurality of predefined thresholds as described herein.

In step 840, a time window describing or corresponding to an $N^{th}$ percentile of transitions in the calculated cumulative distribution, where N may be a predetermined threshold—e.g., the $70^{th}$ percentile—may be determined, chosen, or derived from the cumulative distribution and the list or set of time windows. Other values or percentiles may be used. Thus, embodiments of the invention may choose or derive x for which, for example:

$$\frac{F_x(x)}{\text{Max}(F_x)} \approx N\%$$

In some embodiments of the invention, the list may include time windows at different levels of granularity (e.g., 10 seconds, 20 seconds, etc., or otherwise 200 seconds, 300 seconds, and so forth). Some embodiments of the invention may employ a plurality of time windows in different stages of the dynamic time-window optimization procedure—for example a first time window may be used for screening or discarding routine instances found outside that time window, while a second time window may be determined, chosen, or derived to correspond to or describe a predetermined percentile of transitions in or based on the calculated cumulative distribution as described herein.

A parameter $x_{min}$ defined as, for example, the minimum between a number of occurrences for the first routine in one or more of the edited processes and a number of occurrences of one or more of the transitions within the second time window:

$$x_{min} = \min(x, x_a)$$

where $x_a$ is the value for which $F_x(x_a) = A$, and where A stands for the total number of occurrences or instances of routine A in the process under consideration, may then be calculated (step 850). The smallest time window t in the list of time windows that is larger than $x_{min}$ may then be chosen (step 860).

The transition probability $P_t$ from routine A to routine B may then be calculated in step 870 as for example:

$$P_t = \frac{F_x(t)}{A} * 100$$

Finally, in step 880, the calculated $P_t$ may be compared to a predetermined threshold (e.g., 20%), and if—

$$P_t < \text{threshold}$$

then the transition probability from routine A to routine B may automatically be set to zero. In such manner, transition probabilities below the effective threshold may be discarded while ones of potential value for automation opportunities may be kept. A plurality of thresholds may be used in different stages of the transition probability calculation or recalculation process (as a simple example, a transition probability may be calculated based on measured transition times between pairs of routines AB as illustrated herein, and given that the calculated probability must be found above a first threshold $T_1$ and below a second threshold $T_2$).

The result of an example transition probability calculation or recalculation as outlined herein, e.g., $P_t$, may then replace the original result calculated using an unsupervised approach, e.g., $\text{Prob}(S_1 \rightarrow S_2)$ as provided by AD—to determine or generate an updated process, which may be shown to be a potential candidate for automation as indicated by, e.g., an automation score provided in a report as illustrated herein. In some embodiments of the invention, such score may be determined for the recalculated process and be compared, e.g., to the original process prior to receiving user edits. The process or processes (e.g., included in a report recalculation) may then be either updated based on recalculated transition probabilities or kept unchanged according to the comparison or difference in scores.

In some embodiments of the invention, the semi-supervised automation discovery recalculation engine, module or component, may be physically and/or functionally separate from the unsupervised automation equivalent, such that automation calculation and recalculation may be performed as separate, functionally-independent, and potentially concurrent procedures. In some embodiments of the invention, the resulting corresponding data structure (for example originally created using the AD approach) may include all processes and will override the relevant data structure for example as part of the database. A non-limiting example entry in such database may for example be seen in Table 3.

TABLE 3

| # | Process name | Score | Total time | Applications | Users | # Routines |
|---|---|---|---|---|---|---|
| 1 | New Excel | 78 | 1:02 | Finance.yahoo.com, outlook | {'user2', 'user7'} | 2 |

In some embodiments, the associated data structure for changed and/or resulting and/or recalculated routines within a process may be provided only for changed and/or recalculated processes, include all changed processes' routines and may override the relevant data structure in the database (for example take the same format as displayed in Table 3). In some embodiments, routine can be associated with a list of process IDs—e.g. corresponding to processes [1, 3, 7] as for example illustrated in Table 4 (note that the latter is merely a non-limiting example, and that other formats may be used in different embodiments of the invention).

TABLE 4

| # | Routine ID | Processes IDs |
|---|---|---|
| 1 | 1 | [1] |
| 2 | 2 | [1] |

The corresponding transition data structure or entries may be provided only for changed and/or recalculated processes, include all updated or recalculated routines and may thus override the relevant data structure or entry in such structure, for example in the database as displayed in Table 5 (see also Table 2 herein, describing transition data or information as provided by the AD approach; and note, once again, that the present illustration should be considered non-limiting).

TABLE 5

| # | Process ID | From routine | To Routine | probability | Added by user |
|---|---|---|---|---|---|
| 1 | 1 | 2 | 1 | 41% | False |
| 2 | 1 | 1 | 2 | 27% | True |

The routine, format, entry or data structure as a whole may thus be left unchanged when recalculation is performed, such that routines may not be updated (for example in case where recalculation does not change a given process's structure or workflow). Some embodiments of the invention may allow automatically importing or incorporating calculation results, which may be for instance recalculated or updated processes or reports—as well as details about the processes, their routines and their transitions after recalculation—into a search engine (an example such engine which supports and/or includes JSON documents, in accordance with the format for user edits to processes and reports suggested herein, may be, e.g., the Elasticsearch search engine, although many alternative engines may be used in different embodiments of the invention) as part of the updating of processes following a transition probability calculation or recalculation—such that the updated, automated process or report may be found by a user or business analyst based on appropriate keywords. A search engine may be implemented, for example, in different windows within a GUI as discussed herein and used for receiving edits from a user or business analyst (e.g., as illustrated in FIGS. 2-6). The search engine may allow, for example, to find a report or process which may serve as a starting point for an editing or recalculation process as illustrated herein. Search keywords may include, for example, different routines or routine sequences included in the updated, recalculated process or report; routine, process, or report name or identifier; name or number of source application executing the routine or process; and so forth). Search results may be organized according to different criteria and information, for example as described herein with reference to FIGS. 3 and 5-6. In some embodiments of the invention the old process or report may be archived or deleted once an updated process or report is recalculated—e.g., recalculated process(es) have been updated and calculation results were incorporated into a search engine, replacing entries associated with the old process or report. That is, the recalculated process may be saved in place of the old process (prior to the recalculation procedure), such that the search engine may suggest the former to a user searching for the process (e.g., by process name, or by routine sequence—e.g., in case that both recalculated and old or expired process include the same initial sequence of routines typed in by a user).

Figure 10:
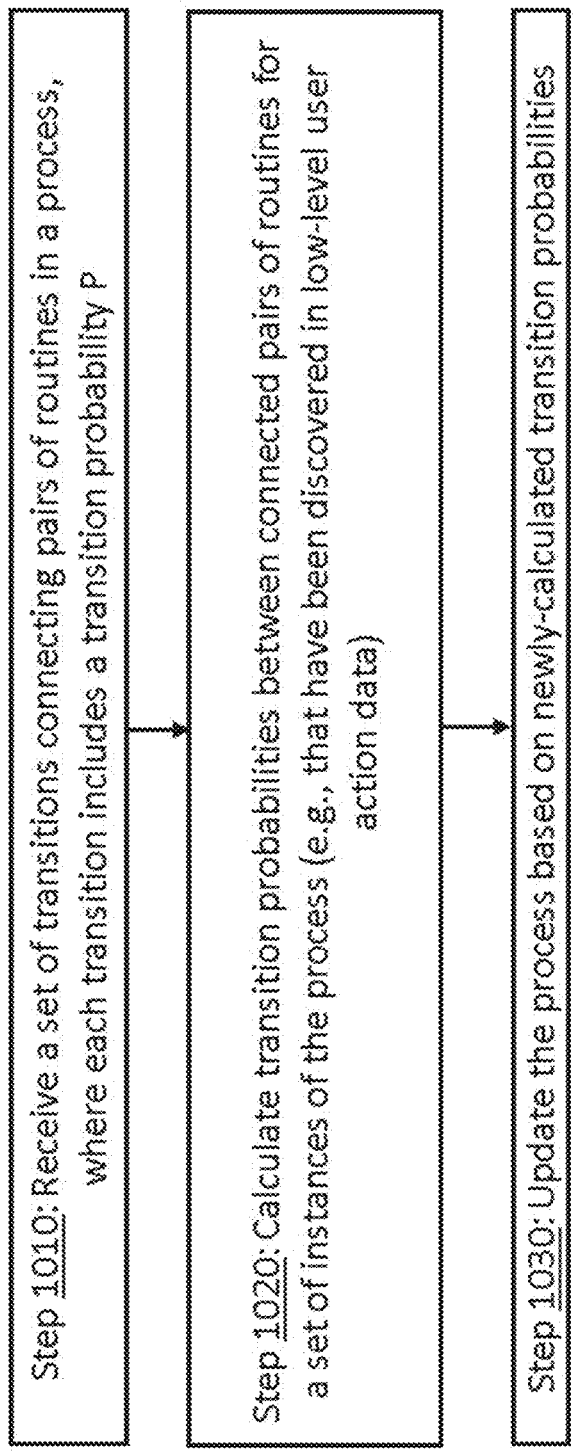
FIG. 10 is a flowchart depicting a simple automation discovery recalculation procedure according to some embodiments of the invention.

FIG. 10. is a flowchart depicting a simple automation discovery recalculation procedure 1000 according to some embodiments of the invention. In step 1010, a set of transitions connecting pairs of routines in a process, where each transition includes a transition probability, may be received as input. Transition probabilities between connected pairs of routines may then be calculated or recalculated for a set of instances of the process, where the instances may have been discovered in or abstracted on top of a plurality of low-level user actions data as described herein (step 1020). The process under consideration may be updated based on the newly-calculated transition probabilities (step 1030).

Embodiments of the invention may improve the technologies of computer automation, big data analysis, and computer use and automation analysis. Existing technologies and non-technology based techniques to analyze computer use data to identify or determine automation opportunities suffer from numerous drawbacks, as explained elsewhere herein. For example, existing technologies are not capable of using low-level desktop events as input data. A human attempting to perform such an analysis would be faced with an unreasonably large amount of data. This is, as a practical matter, impossible to be performed by a human. Embodiments of the present invention may include a practical application of a series of algorithms which result in detection of computer processes which may be automated and the implementation and creation of computer automation processes. Some embodiments may be agnostic to the domain (e.g. the platform and specific programs as well as customer type, segment market, etc.) and language used for user interfaces, or other data, and may work with any data, for any specific programs the user interfaces with.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method for identifying ordered sequences of processes comprising routines, each routine comprising a series of actions input to a computer, the method comprising using one or more computers:
    gathering, by a data collection software executed by a computer processor, a plurality of low-level user action data items describing input by a user to one of a plurality of software programs via a desktop system, each low-level user action data item comprising an input type description, and screen window information;
    determining, using sequential pattern mining, a plurality of routines, wherein each of the routines includes a series of user actions, the series of actions recurring in the low-level user action data items;
    for a given process comprising an ordered sequence of a plurality of the routines:
        recalculating, for a plurality of instances of the given process in the low-level user action data items, one or more transition probabilities for one or more pairs of routines, each pair of routines connected by a transition, wherein each instance of the plurality of instances was used for discovering the given process in the low-level user action data items;
        updating the given process based on the recalculated transition probabilities; and
        automatically executing, by a bot, the updated process, wherein the executing is performed at runtime, and wherein the updated process is compiled into a code.

2. The method of claim 1, comprising receiving edits and assigning a transition probability to one or more of the connected pairs of routines based on the edits.

3. The method of claim 2, comprising triggering the recalculating of transition probabilities based on the edits, wherein the edits comprise changing a plurality of processes including the given process; and
    assimilating constraints on one or more of the plurality of processes following the recalculating of transition probabilities.

4. The method of claim 1, wherein the updating of the one or more of the plurality of processes comprises incorporating one or more recalculation results into a search engine.

5. The method of claim 1, comprising measuring a set of transition times for one or more transitions from a first routine of a given connected pair of routines to a second routine of the connected pair of routines; and
    calculating one or more distributions of transition times based on the measured transition times.

6. The method of claim 5, wherein the recalculating of transition probabilities is based on at least one of the distributions, the measured transition times, and one or more predefined thresholds.

7. The method of claim 6, wherein the measuring of a set of transition times includes choosing a time window for one or more transitions.

8. The method of claim 7, wherein the recalculating of transition probabilities comprises determining a second time window describing a predetermined percentile of the transition times based on one or more of the distributions; and
    calculating a minimum between a number of occurrences for the first routine and a number of occurrences of one or more of the transitions within the second time window.

9. A system for identifying processes comprising ordered sequences of routines, each routine comprising a series of actions input to a computer, the system comprising:
    a computer comprising a processor and a memory, wherein the processor is to:
    gather, by a data collection software executed by the processor, a plurality of low-level user action data items describing input by a user to one of a plurality of software programs via a desktop system, each low-level user action data item comprising an input type description, and screen window information;
    determine, using sequential pattern mining, an ordered sequence of a plurality of routines, wherein each of the routines includes a series of user actions, the series of actions recurring in the low-level user action data items;
    for a given process comprising an ordered sequence of a plurality of the routines:
        recalculate, for a plurality of instances of the given process in the low-level user action data items, one or more transition probabilities for one or more pairs of routines, each pair of routines connected by a transition, wherein each instance of the plurality of instances was used for discovering the given process in the low-level user action data items;
        update the given process based on the recalculated transition probabilities; and
        automatically execute, by a bot, the updated process, wherein the executing is performed at runtime, and wherein the updated process is compiled into a code.

10. The system of claim 9, wherein the processor is to receive edits and assign a transition probability to one or more of the connected pairs of routines based on the edits.

11. The system of claim 10, wherein the processor is to:
    trigger the recalculating of transition probabilities based on the edits, wherein the edits comprise changing a plurality of processes including the given process; and
    assimilate constraints on one or more of the plurality of processes following the calculating of transition probabilities.

12. The system of claim 9, wherein the processor is to incorporate one or more recalculation results into a search engine.

13. The system of claim 9, wherein the processor is to:
measure a set of transition times for one or more transitions from a first routine of a given connected pair of routines to a second routine of the connected pair of routines; and
calculate one or more distributions of transition times based on the measured transition times.

14. The system of claim 13, wherein the recalculating of transition probabilities is based on at least one of the distributions, the measured transition times, and one or more predefined thresholds.

15. The system of claim 14, wherein the measuring of a set of transition times includes choosing a time window for one or more transitions.

16. The system of claim 15, wherein the processor is to:
determine a second time window describing a predetermined percentile of the transition times based on one or more of the distributions; and
calculate a minimum between a number of occurrences for the first routine and a number of occurrences of one or more of the transitions within the second time window.

17. A method for recalculating and updating processes comprising ordered sequences of routines, each routine comprising a series of actions input to a computer, the method comprising using one or more computers:
gathering, by a data collection software executed by a computer processor, one or more low-level user action data items describing input by a user to one of a plurality of software programs via a desktop system, each low-level user action data item comprising an input type description, and screen window information;
determining, using sequential pattern mining, a plurality of routines, wherein each of the routines includes a series of user actions, the series of actions recurring in the low-level user action data items;
receiving edits comprising a set of transitions connecting pairs of the routines;
collecting instances of the routines in a dataset comprising a series of actions input to a computer wherein each instance of the plurality of instances was used for discovering a given process comprising an ordered sequence of a plurality of the routines in the low-level user action data items;
measuring a set of transition times for one or more transitions from one or more of the collected instances of a first routine of a given pair of routines to one or more of the collected instances of a second routine of the pair of routines;
calculating one or more distributions of transition times based on the measured transition times;
recalculating transition probabilities for the given process comprising one or more of the pairs of the routines based on at least one of: the distributions, the measured transition times, and one or more predefined thresholds;
updating the given process based on the calculated transition probabilities, wherein the process comprises a plurality of the routines; and
automatically executing, by a bot, the updated process, wherein the executing is performed at runtime, and wherein the updated process is compiled into a code.

18. The method of claim 17, comprising, if one or more of the collected instances of the second routine of the pair of routines is not within a predefined time window from one or more of the collected instances of the first routine of the pair of routines, then discarding one or more of the transitions prior to calculating one or more distributions of transition times.

19. The method of claim 18, comprising applying constraints on one or more of the transitions following the calculating of transition probabilities.

20. The method of claim 19, wherein the calculating of transition probabilities comprises deriving a second time window describing a predetermined percentile of the transition times based on one or more of the distributions; and
calculating a parameter comprising a minimum between a number of occurrences for the first routine and a number of occurrences of one or more of the transitions within the second time window.

* * * * *